United States Patent [19]

Trumpy et al.

[11] Patent Number: 5,612,667
[45] Date of Patent: Mar. 18, 1997

[54] IN-VEHICLE BAROMETRIC PRESSURE DETECTION SYSTEM

[75] Inventors: David K. Trumpy, Farmington Hills; Marvin P. Kraska, Dearborn, both of Mich.

[73] Assignee: Ford Motor Company, Dearborn, Mich.

[21] Appl. No.: 498,381

[22] Filed: Jul. 5, 1995

[51] Int. Cl.$^6$ .................................................. B60Q 9/00
[52] U.S. Cl. .................. 340/425.5; 340/449; 340/601; 340/70.01; 340/870.1; 340/905; 340/968; 73/178 T
[58] Field of Search ................ 340/905, 425.5, 340/449, 601, 602, 870.01, 870.1, 968; 342/26, 460; 364/420; 73/170.16, 170.14, 178 T

[56] References Cited

U.S. PATENT DOCUMENTS

| | | | |
|---|---|---|---|
| 2,723,388 | 11/1955 | Jacobs | 340/601 |
| 3,594,753 | 7/1971 | Elenbaas | 340/601 |
| 3,603,951 | 9/1971 | Bracken | 340/539 |
| 3,631,435 | 12/1971 | Elenbaas | 340/601 |
| 3,753,117 | 8/1973 | Downing et al. | 73/107.24 |
| 4,170,132 | 10/1979 | Serley | 73/170.14 |
| 4,295,139 | 10/1981 | Arpino | 340/870.01 |
| 4,602,248 | 7/1986 | Foster et al. | 340/601 |
| 4,937,571 | 6/1990 | Bonare | 340/968 |
| 5,105,191 | 4/1992 | Keedy | 340/968 |
| 5,309,139 | 5/1994 | Austin | 340/462 |
| 5,402,116 | 3/1995 | Ashley | 340/601 |

Primary Examiner—Thomas Mullen
Assistant Examiner—Davetta Woods
Attorney, Agent, or Firm—Richard D. Dixon

[57] ABSTRACT

In a vehicular warning system for sensing the approach of severe weather, a pressure sensor generates a first signal representative of the barometric pressure. A computer, coupled to the pressure sensor through the electrical system of the vehicle, generates a second signal responsive to the first signal changing in a time series pattern correlated with a known time series pattern representative of a severe weather system. The computer is coupled through the electrical system of the vehicle to the horn and/or lights for generating warning signals responsive to receiving the second signal, but only when the vehicle is not in the operating mode.

20 Claims, 2 Drawing Sheets

IN-VEHICLE BAROMETRIC PRESSURE DETECTION SYSTEM

BACKGROUND OF THE INVENTION

1. Field of the Invention

This invention relates to a severe weather warning system of the type utilized in a motor vehicle.

2. Description of the Prior Art

Jacobs in U.S. Pat. No. 2,723,388 discloses a device for tracking absolute barometric pressure, and responsive to sudden rather than gradual changes therein, will provide an audible or other detectable signal warning of the imminent approach of severe weather conditions, such as a tornado.

The prior art includes other examples, both mechanical and electronic, of similar severe weather warning detectors. However, in each case these prior art references require the use of special purpose, expensive devices such as atmospheric pressure sensors, computers, and displays. These severe weather warning systems are stand-alone units and are not suitable for use in an automotive environment, not only due to the required ruggedness of the apparatus but also because of the additional space and expense involved.

The present invention, in contrast, utilizes inexpensive, highly accurate and highly reliable components that are already available within the automotive vehicle, but connected into a system that is activated when the automotive vehicle and the components are not otherwise in use. That is, when these automotive components are not used for running or operating the motor vehicle, they are coupled into a different system configuration that is used for detecting and then warning of the onset of severe weather.

In addition to these aforementioned cost and quality advantages, the new system is particularly cost effective because the automobile is usually in close proximity to the operator or other people that are interested in determining the onset of severe weather. For example, when the family automobile is parked at home or is in a parking lot at an office building or other work location, the detection and warning of imminent severe weather will alert those nearby who may not otherwise have access to, or have their attention turned to, other sources of information regarding the approach of severe weather, such as radio, television, etc.

In order to utilize over the long term a microcomputer already located in the automobile, it is important to conserve electrical energy when the alternator is not charging the storage battery in the vehicle. One method of conserving power is to utilize the microprocessor for only short periods of time. However, this approach greatly reduces the computing power available for complex computational tasks. Therefore, the present invention also provides a uniquely efficient computational process, implemented in software to be run on the intermittently powered microprocessor, for acquiring, processing and storing the data, while also providing signals that will result in the warning of severe weather to nearby persons.

Therefore, it is a primary object of the present invention to utilize existing automotive components, when not in use for their normal automotive operational function, for sensing the changes in barometric pressure associated with the approach of severe weather, and then to warn those persons in the vicinity, through either visual or audible means or both. This function is accomplished through the use of existing, high performance components in a location that is convenient and near the persons to be warned.

SUMMARY OF THE INVENTION

In a vehicular warning system for sensing the approach of severe weather, a pressure sensor generates a first signal representative of the atmospheric pressure. A computer is coupled to the pressure sensor through the electrical system of the vehicle when the vehicle is not in an operational mode. The computer generates a second signal responsive to the first signal changing in a time series pattern correlated with a known time series pattern representative of an approaching severe weather system. The computer is coupled through the electrical system of the vehicle to the horn and lights for generating warning signals responsive to receiving the second signal.

BRIEF DESCRIPTION OF THE DRAWINGS

Other objects, features and advantages of the invention will be apparent from a study of the written description and the drawings in which.

DESCRIPTION OF THE PREFERRED EMBODIMENT

Figure 1:
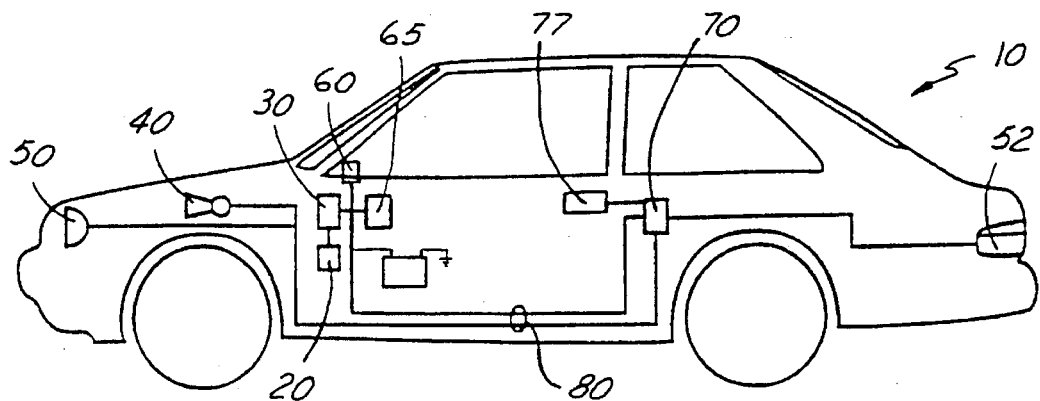
FIG. 1 illustrates in schematic form the pertinent components contained within the electrical system of a normal automotive vehicle.

An automobile, illustrated generally with the reference numeral 10, is shown in FIG. 1 along with the various electrical components, subsystems and systems that are employed for various operational requirements.

A Silicon Capacitive Absolute Pressure (SCAP) sensor 20 (such as Ford part number E7EF-9F479-AZA) is used for sensing the absolute barometric pressure of the atmosphere in which the vehicle operates. The signal from the SCAP sensor is normally used by the electronic engine controller (EEC) 30 for adjusting the air fuel ratio based on barometric conditions that may vary in accordance with the changing altitude and weather conditions during the operational mode of the vehicle. The EEC computer 30 includes a microprocessor (such as a Ford designed 8065) and non-volatile memory that are used in the operation of the vehicle to control the engine and possibly the transmission. However, when the vehicle is not in the operating mode (e.g. when the engine is not operating), the EEC 30 and the SCAP sensor 20 are available for use in the present invention. In a similar manner, the electrically driven horn 40, headlights 50 and taillights 52 of the vehicle are also available for use when the vehicle is not operational, such as when the ignition switch 65 is in the off position. The instrument panel 60, including either LED or LCD displays, may be activated and controlled in appropriate circumstances by either the electronic engine computer 30, or the keyless entry subsystem 70, in order to provide either a numerical or graphical display of the operation of the present invention.

With continuing reference to FIG. 1, a keyless entry subsystem 70 also includes a microprocessor (such as a Motorola 6805 or equivalent) and non-volatile memory of the type that also may be used for processing the barometric pressure data provided by the SCAP sensor 20 when the vehicle is not in the operational mode. The keyless entry subsystem 70 is particularly useful in the present invention because it is already coupled through the wiring harness 80 to the vehicle horn 40, lights 50 and stoplights 52 which serve as audible and visual warning signals activated responsive to improper entry into the vehicle 10. The keyless entry subsystem 70 is particularly useful because it is intended to operate in a reduced power mode when the ignition switch 65 of the vehicle is in the off position. Therefore, the microprocessor in the keyless entry system 70, or the microprocessor EEC computer 30, may be used for processing the barometric pressure in the present invention. The preferred embodiment has the SCAP sensor 20 under control of the keyless entry subsystem 70 when the ignition switch is in the off position. The keyless entry module can take control of the SCAP sensor 20 when the EEC 30 is not using the SCAP sensor. A touchpad data entry device 77, located adjacent the door handle, may be used for data entry, and for control and sequencing of the microprocessor as required.

Figure 2:
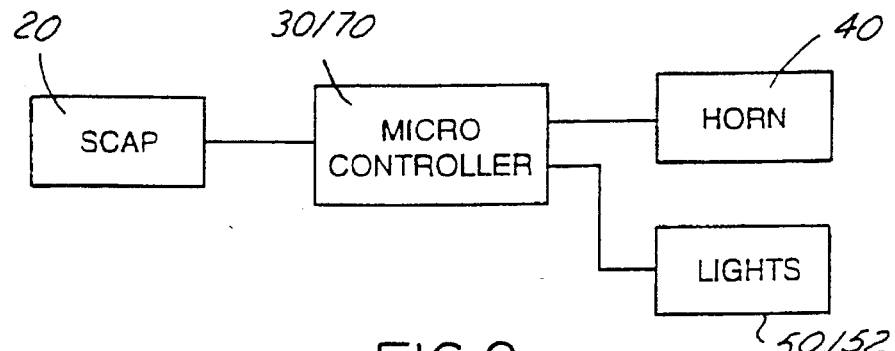
FIG. 2 illustrates in a simplified block diagram form the functioning of the system in accordance with the present invention.

A wiring harness 80 which connects the ignition switch 65, keyless entry subsystem 70, the electronic engine controller 30, the vehicle horn 40 and the lights 50 may be either a typical copper wire and connector wiring system, or as in many new automotive vehicles it may comprise a multiplex communication system. A multiplex communication system compliant with the Society of Automotive Engineers (SAE) J1850 Standard is especially useful in the present invention because coded multiplex signals can be directed along the network to access a variety of nodes, components and subsystems in the network that do not otherwise cooperate when the vehicle is in the operational mode. The multiplex wiring system 80, therefore, eliminates the need for hard wiring additional connections between the operative subsystems and components used in the present invention. A simplified block diagram of the interconnection of the basic elements of the present invention is illustrated in FIG. 2.

Figure 3:
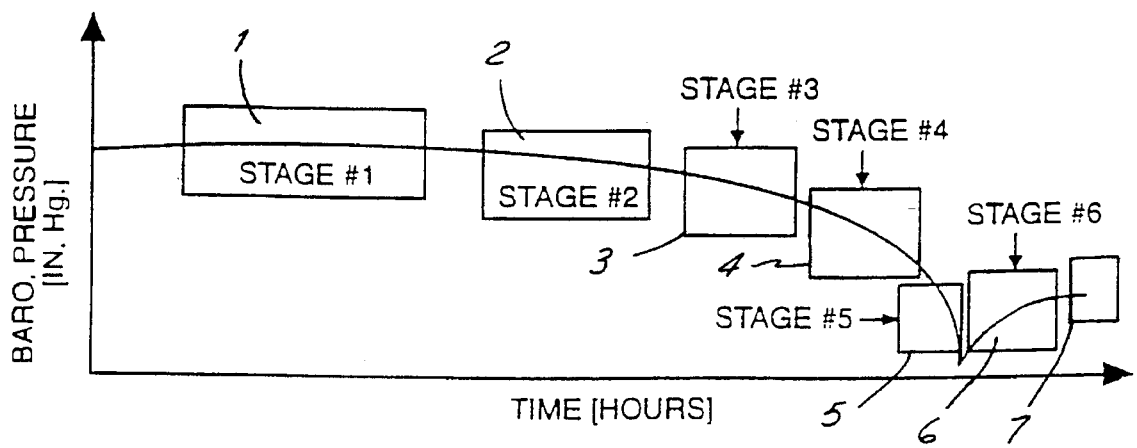
FIG. 3 is a simplified diagram of the stages of barometric pressure measured over time that is characteristic of the onset, and departure of, severe weather such as a tornado.

FIG. 3 shows a simplified pictorial diagram of the time series pattern of absolute barometric pressure for two days preceding the arrival of a severe storm, such as a tornado. Notice that for purposes of clarity in the diagram, the time axis is expanded in the later stages. Other severe storms, such as hurricanes, that have a generally similar decreasing barometric pressure profiles may be also be susceptible to measurement by this same process.

In stage 1, a maximum value of barometric pressure is determined. This maximum value normally lasts for at least twelve hours and includes a period of slow pressure rise, a period of constant high pressure and then a period of slowly decreasing atmospheric pressure. A barometric pressure of approximately 29.8 in.Hg. is characteristic of this stage.

Stage 2 depicts when a severe weather front or system approaches to within 500 miles, the barometric pressure begins to drop. The second stage is characterized by the slow decrease in pressure from the Stage 1 maximum. A barometric pressure drop of approximately 0.2 in.Hg. in a six hour time period is typical for this stage.

When the storm front or severe weather system approaches within 100–200 miles, the barometric pressure drops on the order of 0.05 in.Hg. in one hour. Since severe weather and storm systems travel approximately 30–50 miles per hour, this stage 3 phase can last from between two to four hours, or perhaps more. If the barometric pressure decreases no further than the stage 3 minimum, no warning is necessary because the storm has not approached within a dangerous distance of the sensing system.

In stage 4, the storm front approaches to within 30–50 miles, and the barometric pressure can drop approximately 0.1 in.Hg in twenty minutes. Assuming that stages 1, 2 and 3 have occurred in sequence, then a preliminary warning may be issued that severe weather can be expected within an hour or so. In stage 5, severe weather is approaching rapidly and barometric pressure may drop 0.2 in.Hg in only 10 minutes or so. This sequence, when preceded by stages 1, 2, 3 and 4, as previously discussed, will constitute the profile, or time series pattern of changes in barometric pressure, of the type sensed by the present invention and discussed subsequently.

In stage 6, the barometric pressure begins to rise, indicating that an all-clear signal can be generated. It should be noted that while stage 6 is shown following stage 5, the rapid increase in the barometric pressure which follows the approach of a storm front also may occur after either stage 4 or 5, and the resulting all-clear signal can be issued then if appropriate.

Figure 4:
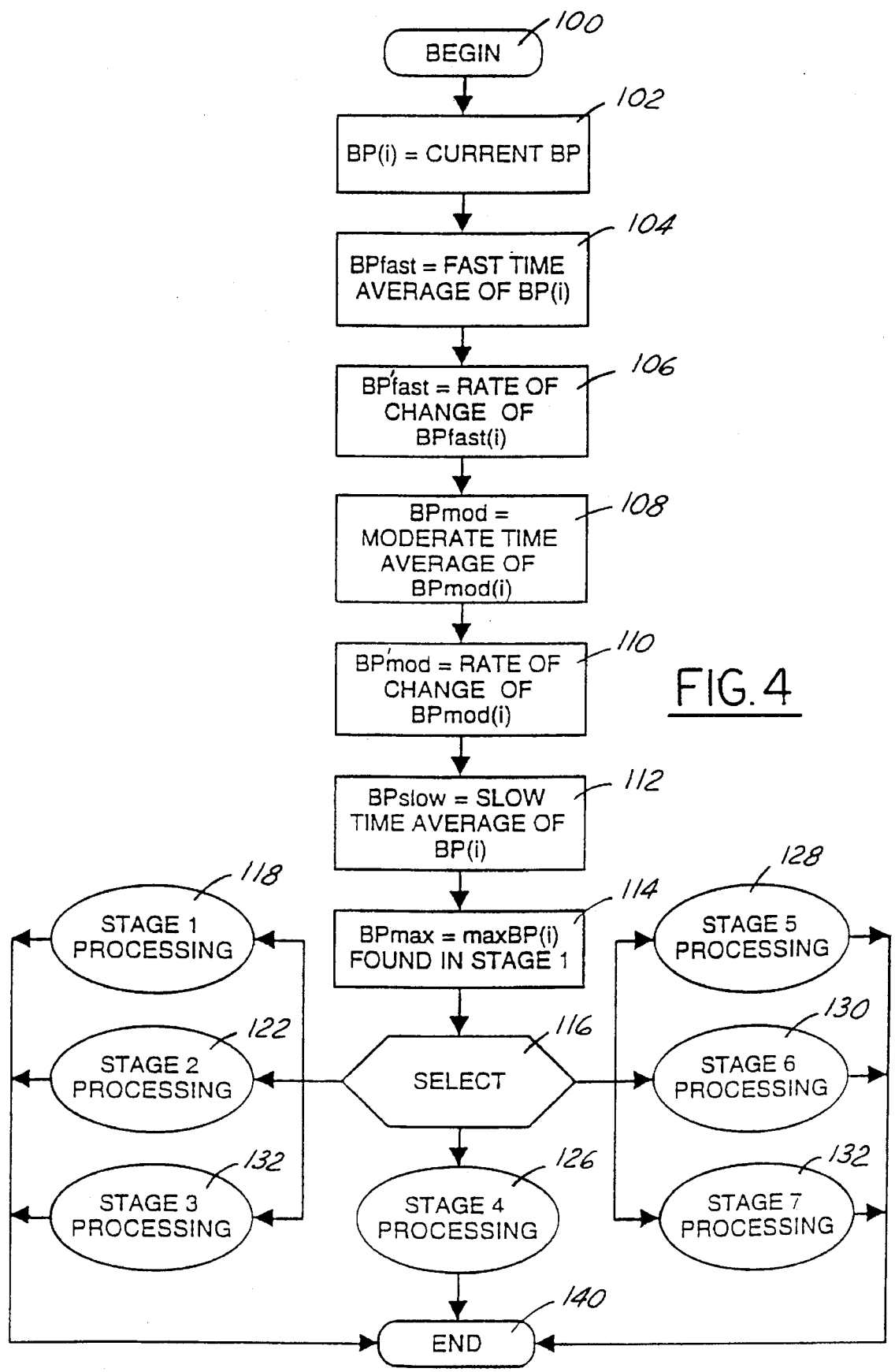
FIG. 4 is a simplified flow chart showing a preferred software implementation for sensing the time series pattern comprising the stages in barometric pressure in accordance with the present invention.

Turning now to FIG. 4, a simplified logic flow diagram for software to be processed by the microprocessor in the keyless entry subsystem 70 in accordance with the present invention begins at step 100. At step 102 the barometric pressure from the SCAP sensor 20 is sampled at a constant rate of approximately once every one or two minutes, giving a value of instantaneous barometric pressure of IBP(i) for the sampling period T.

In step 104, three different averages are calculated and stored over a specific number of consecutive samples. For example, the pressure may be averaged over 1, 9 and 25 samples, which would translate to 1 (2), 9 (18) or 25 (50) minute averages for sampling rates of 1 (2) minutes. The averages are then computed to generate a filtered time history of the barometric pressure, BP(i), by filtering the instantaneous pressure samples with a rolling average filter. This is accomplished with $BP(i)=K1*BP(i-1)+(1-K1)*IBP(i)$, where K1 is a calibratable instrumentation constant this is fixed and stored in a non-volatile memory used with the microcomputer.

In step 106 each of these calculated averages are smoothed and differentiated simultaneously, using an N-point discreet convolution between the time series history of the absolute barometric pressure and a convolution kernel, which produces a filtered rate of change of barometric pressure BP'(i). Note that BP'(i) equals the summation from I to N of $BP(j)*CK(j)$, where CK(j) are implementation constants that are fixed in non-volatile memory used with the microcontroller. As an example, the coefficients for a nine interval differentiation are:

CK(1)=86.0/188.0

CK(2)=−142.0/1188.0

CK(3)=−193.0/1188.0

CK(4)=−126.0/1188.0

CK(5)=0.0/1188.0

CK(6)=126.0/1188.0

CK(7)=193.0/1188.0

CK(8)=142.0/1188.0

CK(9)=−86.0/1188.0

In a similar manner, in step 108 the barometric pressure is averaged in a manner similar to step 104 and is recorded as BPmod. In step 110, BP'mod is assigned a value, which is determined after the summation in step 106 is carried out for at least two different values of N, for example, 9 and 25 as described in step 104 of the preferred embodiment. This produces two different rates of change of barometric pressure, that is, BP'fast in step 106 and BP'mod in step 110. In step 112 the barometric pressure is averaged, as in step 104, and is then recorded as BPslow.

Stage 1 processing occurs at step 118. At this step the Barometric Pressure (BP) is assumed to be high and is in a slowly changing quiescent state. The maximum value of pressure in step 118 is recorded in step 114 for use in other stages. This recorded maximum is a relative or local maximum level. If the barometric pressure value of BP'mod exceeds the stored value (C3 of about 0.1 in.Hg per six hours), then the barometric pressure is changing more rapidly, either up or down, and the processing proceeds to stage 2 calculations which are represented by reference numeral 122.

In stage 2 the BP is changing, usually decreasing due to the approach of a low pressure or storm system. Some change in BP has been detected by the threshold on BP'mod. This change is normally a decrease in pressure, that is, BP'mod is negative, and marks the approach of the storm system. However, if BP'mod is positive and greater than some small positive value C9, or approximately 0.025 in.Hg per hour, then it could be the result of a momentary dip and then rise in the barometric pressure, which could be interpreted as a false indication. If BP'mod is greater than C9(positive), then the algorithm is directed to step 132.

On the other hand, if BP'mod is not greater than the small positive value C9, a valid decrease in pressure has been detected. To confirm that this decrease represents an approaching low pressure area, the stage 2 processing then compares BP'fast against some small negative value C4, which is approximately −0.025 in.Hg per hour. If the faster rate BP'fast is more negative than C4, processing will continue at stage 3 in the next sample interval. If the fast rate is not greater, processing will remain in stage 2.

The stage 3 processing occurs at step 132. Stage 3 processing is characterized by the BP decreasing more rapidly than in Stage 1 or Stage 2. Once again, BP'mod is compared to a small positive value (C9). If the BP begins to rise, processing will be directed to step 132. In a typical case, the BP will continue to drop indicating that the storm will be approaching. To further confirm and assess the severity of the storm front, BP'fast is compared with a larger negative value C5, which is approximately −0.05 in.Hg per hour. Note that C5 is less than C4, which indicates that a larger negative rate of change is required. If the larger negative rate of change is exceeded, the average pressure BPmod is compared against the highest value of BP seen in stage 1 (at step 114), that is, the absolute pressure and not the rate of change pressure. If the BP currently has dropped by some fixed amount C11, which is approximately 0.1 in.Hg, from the local relative maximum found in stage 1 (BPmax), then severe weather has been confirmed and processing will continue in stage 4 on the next sample. If none of the above conditions are satisfied, processing remains in a stage 3 at step 132.

Stage 4 processing occurs at step 126 and is designed to confirm that the storm front is approaching, and then to generate the least severe warning signal. First, BP'mod is compared to a small positive value C9. If the BP begins to rise, a recovery has been detected and the storm front is departing the area. Processing will be directed to step 132. However, if the barometric pressure continues to decrease, a first of visual alarm signal is generated. This visual alarm signal may be used to activate the headlights 50, taillights 52 or instrument panel display 60 as previously described. This visual warning signal represents the least severe condition detected by the invention.

It is possible to experience very severe weather that is capable of causing great physical damage. Since the more intense the conditions, the value of BP'fast is compared to some larger negative value C6, which is on the order of −0.1 in.Hg per hour, and a larger negative value than C5. As a further check, the value of BPfast, that is, the pressure and not the rate of change of pressure, is compared to Bpmax, the highest value sensed during stage 1 processing. If the barometric pressure has dropped by some fixed amount C10, which is on the order of 0.2 in.Hg from the local relative maximum, then processing will progress to stage 5, which represents the most severe weather stage detected by this invention.

Stage 5 processing is shown at reference number 128 and confirms that the storm front is approaching, thereby resulting in a second warning signal being generated. If the visual warning signal or alarm is not acknowledged by an operator from the prior steps, then an audible alarm is activated by the second warning signal to indicate that severe weather is approaching. As previously discussed, an audible alarm can include the activation of the horn 40.

In stage 5 processing at step 128, when BP'fast is greater than some positive value C7, which is about 0.025 in.Hg per hour, it is possible that the weather is recovering without the storm actually passing through the local area. In this situation, stage 6 processing is initiated for the next sample interval, as illustrated by reference numeral 130. The visual and audible alarms will continue, and processing will remain in Stage 6 until the barometric pressure begins to rise.

Stage 6 processing confirms that the barometric pressure is recovering and weather conditions are improving. Stage 6 follows the same general logic steps as the beginning of stages 2 through 4. If BP'mod is greater than C9, a small positive value, all warnings are canceled and processing is directed to step 132. Otherwise, processing continues in Stage 6.

Stage 7 processing, shown by reference numeral 132, is used to reinitialize the detection logic. Stage 7 waits for pressure to be slowly changing again, that is, the absolute value of BP'mod is less than C1, which is approximately 0.1 in.Hg per six hour period. Then and only then is the value of BPslow compared against the previous local maximum (Bpmax). When the barometric pressure returns within a fixed value C2, of about 0.075 in.Hg, of its previous high, then the algorithm returns to stage 1 processing at the next sample interval to await the next change in barometric pressure.

Since the software is written in modules corresponding to different stages of storm approach and warning (FIG. 3), and since processing advances sequentially in a time series pattern of changes in BP from one stage to the next based on sensor data and resulting calculations, the preferred embodiment includes a selector step, shown at reference numeral 116, to select one of the seven processing steps corresponding to the stages of storm progress described herein. The between stages in software processing and the interchange of data among the software modules is required to effect proper operation of this invention. The events causing the selector to move between processing stages have been explained with regard to each of the seven stages.

At the conclusion of any of the stage algorithms, processing is directed to step 140, where the microprocessor waits until the specified sampling interval (T) is satisfied, then processing is directed to step 100, where new data is acquired. During step 140, power may be conserved by reducing processing to the minimum necessary to mark the passage of time.

As used herein, the constant values in each of the above steps are as follows:

C1=0.100 (in.Hg per 6 hours)
C2=0.075 (in.Hg per 6 hours)
C3=0.100 (in.Hg per 6 hours)
C4=−0.025 (in.Hg per 6 hours)
C5=−0.050 ( in.Hg per 6 hours )
C6=−0.100 (in.Hg per 6 hours)
C7=0.025 (in.Hg per 6 hours)
C8=not used
C9=0.025 (in.Hg per 6 hours)
C10=0.200 (in.Hg per 6 hours)
C11=0.100 (in.Hg per 6 hours)

While the best modes for carrying out the invention have been described in detail, those familiar with the art to which this invention relates will recognize various alternative designs and embodiments for practicing the invention as defined by the following claims.

We claim:

1. A warning system for sensing the approach of an atmospheric disturbance, comprising:
    a vehicle powered by a motor and having an electrical system, a first pressure sensor, a computer, and a first warning generator, each used in the normal operation of the vehicle;
    coupling means for coupling, when said vehicle is not in an operating mode, said first pressure sensor through said electrical system to said computer for calculating the changes in atmospheric pressure over time;
    means for activating said first warning generator responsive to said computer calculating a time series pattern of changes in the atmospheric pressure characteristic of an approaching atmospheric disturbance, wherein said first warning generator provides warning of an approaching atmospheric disturbance to nearby persons when said vehicle is not in an operating mode.

2. The atmospheric disturbance warning system as described in claim 1 wherein said coupling means is activated whenever an ignition switch in said vehicle is in the off position.

3. The atmospheric disturbance warning system as described in claim 1 wherein said first pressure sensor comprises an atmospheric pressure sensor for sensing the pressure density of the ambient air.

4. The atmospheric disturbance warning system as described in claim 1 wherein said computer comprises an engine control computer coupled to and for controlling said motor of said vehicle when in an operating mode.

5. The atmospheric disturbance warning system as described in claim 1 wherein said computer comprises a microprocessor used for controlling non-motor electrical functions in said vehicle when said vehicle is in an operating mode.

6. The atmospheric disturbance warning system as described in claim 1 wherein said time series pattern of changes in the atmospheric pressure characteristic of the atmospheric disturbance comprise a time series of decreasing atmospheric pressures over a consecutive series of shorter time periods.

7. The atmospheric disturbance warning system as described in claim 6 further including means for deactivating said first warning generator responsive to the atmospheric pressure proceeding through said time series of decreasing atmospheric pressures and then increasing sharply.

8. The atmospheric disturbance warning system as described in claim 1 wherein said first warning generator comprises a horn normally operated as part of said electrical system of said vehicle.

9. The atmospheric disturbance warning system as described in claim 1 wherein said first warning generator comprises headlights normally operated as part of said electrical system of said vehicle.

10. The atmospheric disturbance warning system as described in claim 1 wherein said first warning generator comprises an instrument panel display normally operated as part of said electrical system of said vehicle.

11. The atmospheric disturbance warning system as described in claim 10 wherein said first warning generator further includes a remote warning indicator coupled to said instrument panel display.

12. A warning system for sensing the approach of a severe atmospheric disturbance, comprising:
    a pressure sensor for generating a first signal representative of the local atmospheric pressure, said pressure sensor coupled to an electrical system of the vehicle;
    a computer, coupled through said electrical system to said pressure sensor, for generating a second signal responsive to said first signal changing in a time series pattern representative of decreases in the atmospheric pressure;
    an audible warning generator, coupled to the electrical system of the vehicle, for generating an audible warning signal responsive to receiving said second signal.

13. The automotive warning system as described in claim 12 wherein said pressure sensor coupled to and operated in conjunction with the internal combustion engine system of the vehicle when in the normal operating mode, but which is operated in conjunction with said computer when the internal combustion engine is not in a nonoperating mode.

14. The automotive warning system as described in claim 12 wherein said computer is coupled through the electrical system of the vehicle to an ignition switch for providing electrical power to said computer when said ignition switch is in the off position.

15. The automotive warning system as described in claim 14 wherein said computer comprises an engine control computer for controlling the internal combustion engine of the vehicle.

16. The automotive warning system as described in claim 12 wherein said computer comprises a computer for controlling systems other than the internal combustion engine of the vehicle.

17. The automotive warning system as described in claim 12 wherein said computer includes comparison means for comparing the changes of the time series pattern of said first signal with a known sequence of changes representative of the approach of the tornado, and for generating said second signal responsive to said comparison producing a correlated match.

18. The automotive warning system as described in claim 17 wherein said comparison means generates said second signal only responsive to a correlated match being detected in each time segment in said time series pattern of changes of said first signal.

19. A process for warning of the approach of a severe atmospheric disturbance, said method comprising the steps of:

(a) energizing a computer used in the electrical system of a vehicle when the motor of the vehicle is not in an operating mode;

(b) sensing a first signal generated by a barometric pressure sensor as representative of the local barometric pressure;

(c) calculating and then storing a time series pattern of changes in said first signal representative of the atmospheric pressure changing as a function of time;

(d) correlating the rate of change in the time series pattern of changes of said first signal with a known pattern of increasingly rapid decreases in atmospheric pressure representative of the atmospheric disturbance, and generating a second signal responsive to sensing a match; and (e) generating a warning signal responsive to receiving said second signal.

20. The process as described in claim 19 wherein step (d) further includes the substep of generating said second signal only responsive to a relative correlation being detected in each time segment in the time series pattern of changes in said first signal.

* * * * *